United States Patent
Yamamoto

(10) Patent No.: US 8,142,576 B2
(45) Date of Patent: Mar. 27, 2012

(54) CLUTCH MEMBER AND PROCESS FOR MANUFACTURING THE SAME

(75) Inventor: Yuji Yamamoto, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 855 days.

(21) Appl. No.: 12/280,589

(22) PCT Filed: Feb. 27, 2006

(86) PCT No.: PCT/JP2006/304183
§ 371 (c)(1),
(2), (4) Date: Aug. 25, 2008

(87) PCT Pub. No.: WO2007/097043
PCT Pub. Date: Aug. 30, 2007

(65) Prior Publication Data
US 2009/0008211 A1    Jan. 8, 2009

(51) Int. Cl.
C22C 38/02 (2006.01)
C22C 38/04 (2006.01)
C22C 38/18 (2006.01)

(52) U.S. Cl. .................... 148/579; 148/333

(58) Field of Classification Search .......... None
See application file for complete search history.

(56) References Cited

U.S. PATENT DOCUMENTS
5,470,529 A * 11/1995 Nomura et al. ........... 148/333
2005/0092396 A1   5/2005 Takemura et al.

FOREIGN PATENT DOCUMENTS

| JP | 2-149645 A | * | 6/1990 |
|---|---|---|---|
| JP | 5 98357 | | 4/1993 |
| JP | 5-345952 A | * | 12/1993 |
| JP | 7-138696 | | 5/1995 |
| JP | 10 251757 | | 9/1998 |
| JP | 2002 121647 | | 4/2002 |
| JP | 2002 363644 | | 12/2002 |
| JP | 2003 89846 | | 3/2003 |
| JP | 2003 278768 | | 10/2003 |
| JP | 2004 225743 | | 8/2004 |
| JP | 2005 298967 | | 10/2005 |
| JP | 2005 344194 | | 12/2005 |

OTHER PUBLICATIONS

Japanese Office Action issued Jun. 21, 2011, in Patent Application No. 2008-501593 (with English-language translation).

* cited by examiner

*Primary Examiner* — Rodney Bonck
(74) *Attorney, Agent, or Firm* — Oblon, Spivak, McClelland, Maier & Neustadt, L.L.P.

(57) ABSTRACT

A clutch member and a process for manufacturing the same. In the clutch member, a steel sheet has an initial composition of 0.32 to 0.38% of C, 0.15% or less of Si, 0.3 to 0.5% of Mn, and 0.16 to 0.60% of Cr, by mass; and has an initial uniformly dispersed structure of carbide with an average particle diameter of 0.1 to 1.2 μm; and is subjected to punch and subsequent heat treatment for the main body to have a tensile strength of 1307 to 1633 MPa, hardness of 400 to 500 HV, impact value of 70 J/cm² or more, and degree of flatness of 0.15% or less which is obtained by a formula of F=d/D where d is camber of the flat portion and D is a diameter of a circumscribed circle of the main body.

4 Claims, 2 Drawing Sheets

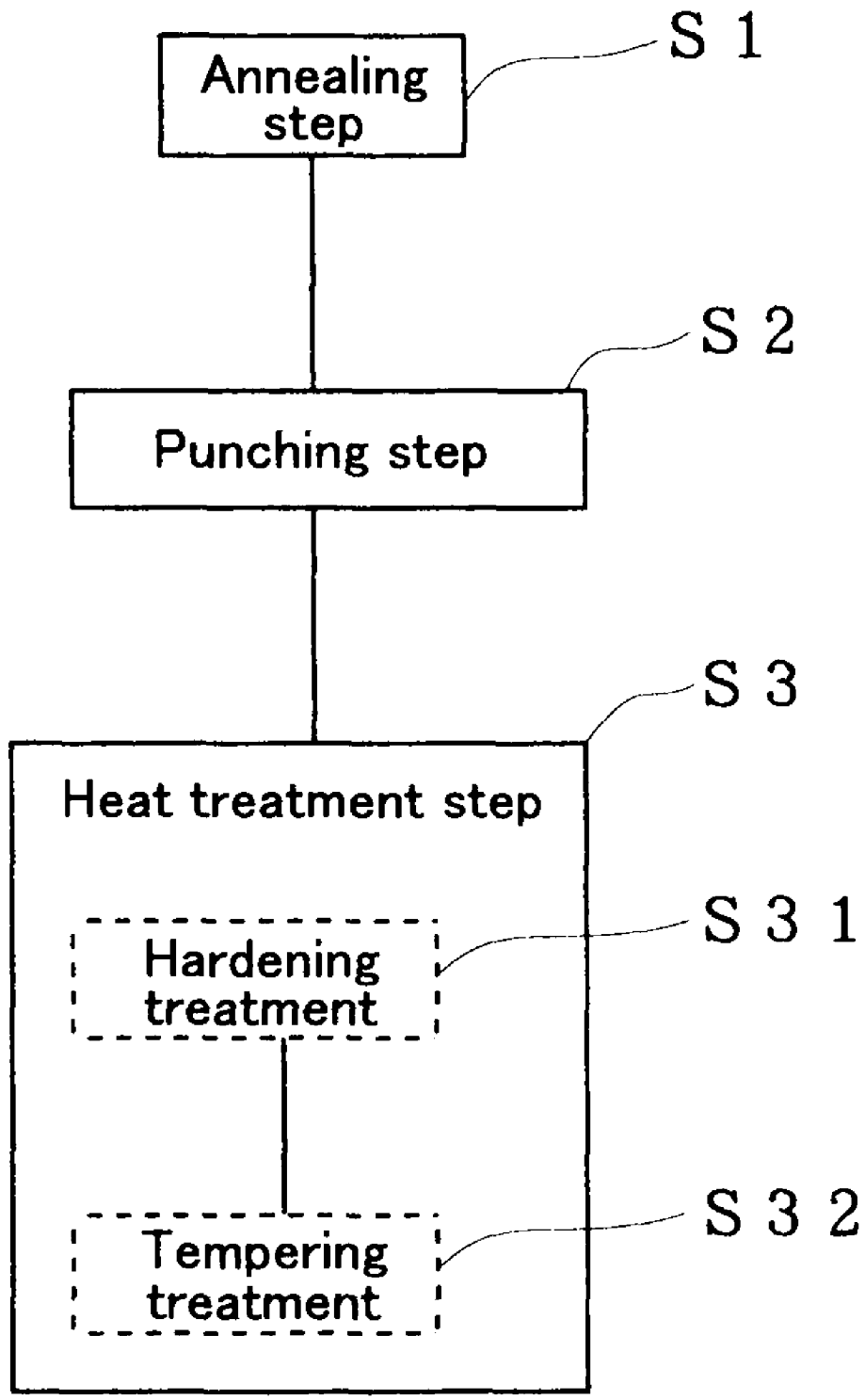

CLUTCH MEMBER AND PROCESS FOR MANUFACTURING THE SAME

FIELD OF THE INVENTION

The present invention relates to a clutch member for use in a motor vehicle, etc. and a process for manufacturing the same, and, more particularly, to a clutch hub in a dry type single plate clutch and a process for manufacturing the same.

BACKGROUND ART

Conventionally, a clutch hub in a dry type single plate clutch has been manufactured by punching a steel sheet obtained by annealing a hot-rolled steel sheet of an alloy steel such as SCM435, SCr435 or SCM440 as a raw material into a predetermined configuration, and subjecting the punched steel sheet to heat treatment. These alloy steels, however, exhibit high hardness as the raw material so that there may occur forming defects such as distortions, tears, etc. in the punching step.

Accordingly, it can be considered to accelerate the softening of the raw material by adjusting the annealing temperature or extending the annealing time. In this case, cost for the raw material increases, but stable punchability inclusive of stable tool life has not been sufficiently effected.

In addition, the above-described alloy steels exhibit the problem that toughness after heat treatment is low. In order to improve toughness, the tempering temperature may be raised, but, in this case, there occurs lowering of strength so that both desired strength and desired toughness cannot be effected.

Furthermore, there also occur distortions in the alloy steels due to punching and following heat treatment so that the correcting step of correcting distortions, such as press-tempering, must be provided after heat treatment. Consequently, there are also exhibited the problems that the productivity is lowered, and the manufacturing cost is increased.

Publication of unexamined Japanese patent application No. Hei5-098357 discloses the technique relating to the production of a high carbon steel sheet excellent in formability and toughness. However, in the steel composition disclosed therein, the Mn content is as high as 0.6 to 1.50 mass % so that even if the softening step is carried out by annealing prior to forming, sufficient improvement in punchability cannot be expected.

And Publication of unexamined Japanese patent application No. 2002-121647 discloses a heat treated steel sheet excellent in formability and abrasion resistance, and its production method. And this publication proposes the structure containing spheroidized cementite and graphite with an area rate of 10% or less and with a diameter of 10 μm or less as the internal structure of the steel sheet prior to working. However, high frequency induction heating is exemplified as the heat treatment, and this technique cannot be directly applied to the manufacturing of the clutch member.

SUMMARY OF THE INVENTION

The present invention has been made considering these circumstances, and has an object of providing an inexpensive clutch member which can have desired abrasion resistance and desired degree of flatness by subjecting a steel sheet excellent in punchability to punching and heat treatment, and a process for manufacturing the same.

The present inventors have noted that by decreasing the Si content and the Mn content in the steel sheet, softening of a raw material can be accelerated, and that by adding a proper amount of Cr and a proper amount of B thereto, hardenability can be ensured. And they have found that by imparting good punchability and preferable hardenability, occurrence of distortions in a heat treated material can be greatly restrained, and a distortion correcting process which has been needed in the conventional alloy steel can be omitted, and they have completed the present invention.

Namely, the clutch member in accordance with the present invention is the clutch member with a predetermined configuration including flat portions, which is characterized in that a steel sheet composed of 0.32 to 0.38% of C, 0.15% or less of Si, 0.3 to 0.5% of Mn, and 0.16 to 0.60% of Cr by mass ratio, the balance being Fe and inevitable impurities, and having a uniformly dispersed structure of carbide with an average particle diameter of 0.1 to 1.2 μm is used as a raw material, and that the steel sheet is subjected to punching and heat treatment sequentially so that the clutch member has a tensile strength of 1307 to 1633 MPa, hardness of 400 to 500 HV, impact value of 70 J/cm$^2$ or more, and degree of flatness F, which is defined by the equation: $F=d/D\times100$, of 0.15% or less. In this case, d is camber of the flat portion (distance from a horizontal plane) and D is the diameter of a circumscribed circle of the clutch member.

It is desired that the steel sheet as the raw material of the clutch member in accordance with the present invention has a tensile strength of 450 MPa or less and a hardness of 150 Hv or less.

And the manufacturing process of the clutch member in accordance with the present invention is characterized in that the manufacturing process includes an annealing step of softening a steel sheet composed of, by mass ratio, 0.32 to 0.38% of C, 0.15% or less of Si, 0.3 to 0.5% of Mn, and 0.16 to 0.60% of Cr, the balance being Fe and inevitable impurities, a punching step of forming the annealed steel sheet into a sheet-shaped raw material with a predetermined configuration, and a heat treatment step of subjecting the formed sheet-shaped raw material to heat treatment to obtain a heat treated material, and that the conventionally needed correcting step of correcting distortions of the heat treated material is omitted.

It is desired that the annealing process is the process of heating at 650 to 700° C. for 10 to 50 hours, and the heat treatment step includes a hardening treatment of heating at 840 to 880° C. for 1 to 2 hours and putting in oil of 60 to 70° C., and a tempering treatment of heating at 260 to 320° C. for 1 to 2 hours.

The steel sheet for use in the clutch member in accordance with the present invention is arranged such that the Si content and the Mn content are made low, as compared with those of the alloy steel as the conventional raw material. Consequently, softening of the raw material by annealing is facilitated so that the raw material with a tensile strength of 450 MPa or less and a hardness of 150 Hv or less can be obtained. Therefore, preferable punchability can be imparted to the raw material for the steel sheet. In addition, in the punching step, the life of tools such as dies can be extended to about 1.5 times as long as those in the case of the conventional alloy steel.

Furthermore, since a proper amount of B and a proper amount of Cr are contained, coarsening of crystal grains can be restrained by virtue of effects thereof in the heat treatment step. Therefore, the toughness can be improved by about 20% in spite of the hardness being approximately equal to that of the conventional alloy steel. The improvement in toughness enables the decreasing of the sheet thickness of products, whereby the size and weight of clutch products as well as spaces therefor can be reduced.

In addition, distortions of members can be reduced without carrying out any correcting step so that a great improvement in productivity as well as a reduction of the manufacturing cost can be expected. By reducing the distortions, eccentricity of the clutch products can be restrained so as to enable the improvement in shift-feeling properties of the clutch as well as decreasing of the size and weight thereof.

BRIEF EXPLANATION OF THE DRAWINGS

FIG. 3 is a block diagram explaining the manufacturing process of a clutch member in accordance with the present invention.

DETAILED DESCRIPTION OF PREFERRED EMBODIMENTS

Figure 1:
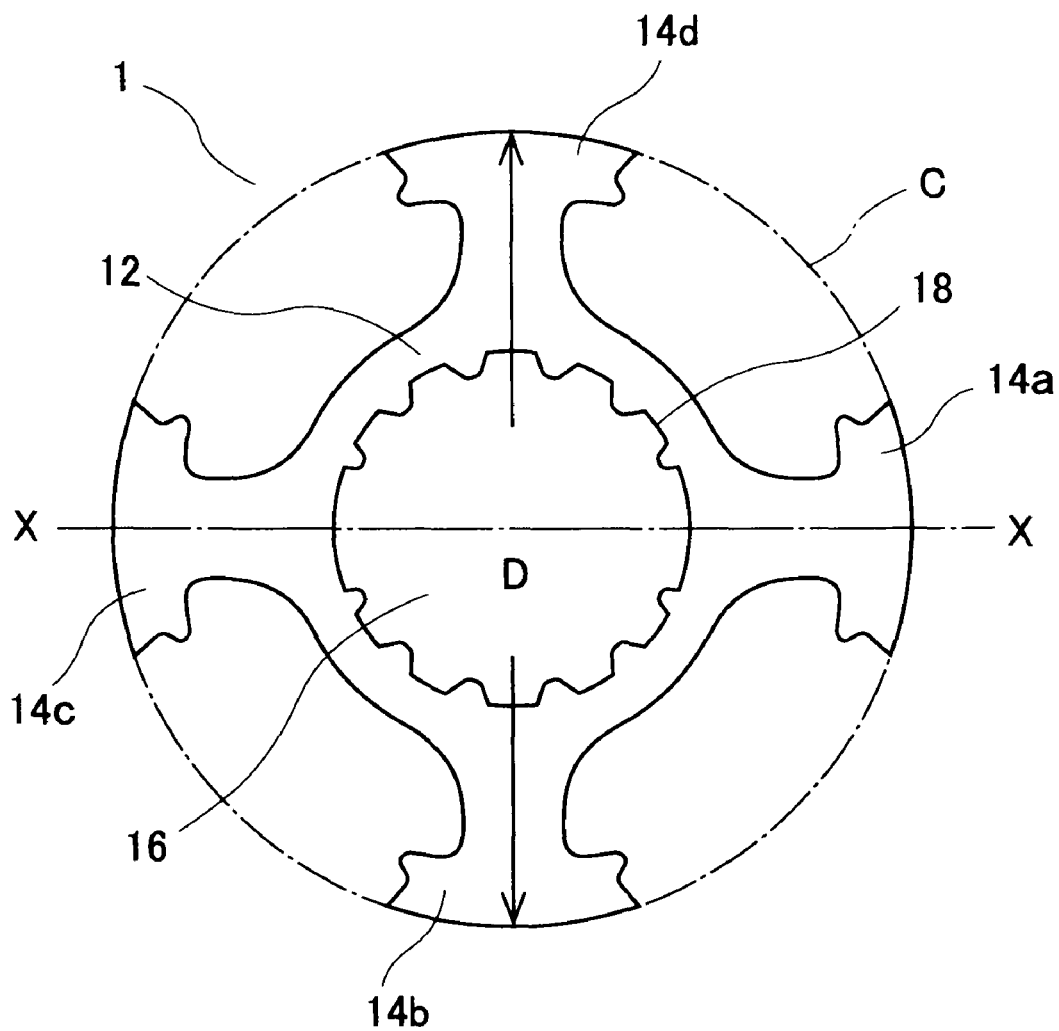
FIG. 1 is a plan view showing one example of a clutch hub as a clutch member in accordance with the present invention.

A. Mode for Carrying Out the Invention (Composition of Steel Sheet)

First, reasons for definition of the composition of a steel sheet in accordance with the present invention will be explained.

(1) C content: 0.32 to 0.38% (mass %, Similarly in Following Cases)

C is an element which serves to enhance the hardenability of steel, and is a component effective in ensuring the strength of final products. In order to obtain this effect, the C content must be increased to 0.32% or more. But, when the content exceeds 0.38%, the punchability lowers. Therefore, the C content is determined to the range from 0.32 to 0.38%.

(2) Si: 0.15% or Less

Si is an element which is solved in ferrite as a solid phase, and raises the strength of the raw material due to the solution hardening thereof. However, when an excess amount is added, the base of the raw material becomes hard to deteriorate the punchability. Therefore, the Si content is determined to 0.15% or less.

(3) Mn: 0.30 to 0.50%

Mn is an element which is essential to be added for ensuring the hardenability. In order to stably obtain the hardness of the clutch member, which is required to exhibit abrasion resistance, 0.30% or more must be added. However, when an excess amount is added, similarly to the case of Si, the hardness of the material prior to punching is raised. Therefore, the Mn content is determined to the range from 0.30 to 0.50%.

(4) Cr: 0.16 to 0.60%

Cr is an alloy component effective in improving the hardenability, but in the case of less than 0.16%, adding effect is not remarkable so that the hardness after hardening becomes short and greatly depends on the cooling rate upon hardening, whereby the hardness after hardening may become unstable. However, when a large amount of Cr, which exceeds 0.60%, is contained, the punchability before hardening is remarkably deteriorated. Therefore, the Cr content is determined to the range from 0.16 to 0.60%.

(5) B: 0.0010 to 0.0050%

B greatly improves the hardenability of a steel material by adding an extremely small amount, and has an action of strengthening grain boundaries by lowering energy in the grain boundaries. By adding 0.0010% or more, the effect thereof becomes remarkable. And this is an alloy component which is needed to stably obtain the hardness of the heat treated material, but when an excess amount of more than 0.0050% is added, the effect is saturated to deteriorate the toughness oppositely. Therefore, the B content is determined to the range from 0.0010 to 0.0050%.

(Internal Structure of Raw Material)

The internal structure of a raw material prior to punching is made to have a uniformly dispersed structure of carbide with an average particle diameter of 0.1 to 1.2 μm. In this case, the uniformly dispersed structure of carbide means the internal structure in which carbide is spheroidized, and the spheroidized carbide disperses uniformly in ferrite without being locally dispersed.

The particle diameter of carbide greatly affects the occurrence of voids upon punching. When carbide becomes fine, and is uniformly dispersed, occurrence of voids can be restrained, but when the average particle diameter of carbide is less than 0.1 μm, the hardness rises and the ductility becomes worse, whereby ruptures may occur to lower the punchability. In addition, when the average particle diameter of carbide becomes 1.2 μm or more, voids occur upon intensively working to enlarge shear droops, whereby tears may occur to lower the punchability. Therefore, the average particle diameter of carbide is adjusted to the range from 0.1 to 1.2 μm. The average particle diameter of carbide can be adjusted with the annealing temperature in the annealing treatment. In this case, with respect to the particle diameter of carbide, the particle diameter of each carbide is an average of a major axis and a minor axis thereof, and the average particle diameter of carbide is an averaged value of particle diameters of respective carbides.

(Characteristics of Clutch Member)

Hereinafter, characteristics to be provided in the clutch member in accordance with the present invention will be explained.

(1) Tensile Strength: 1307 to 1633 MPa

For example, a clutch hub of a dry type single plate clutch rotates at a high rate, and generates a high power so as to be required to have a higher strength than that of an integral type clutch hub. Therefore, the lower limit thereof is determined to 1307 MPa. However, the strength which is stably obtained with hardened materials are limited so that the upper limit thereof is determined to 1633 MPa.

(2) Surface Hardness: 400 to 500 HV (Load: 1 kg)

The surface hardness is an important characteristic for ensuring the abrasion resistance of the clutch member, and when it is less than 400 HV, abrasion may occur in sliding portions so as to be not favorable. And, when it is hard over 500 HV, a counter material may be attacked, or delayed fracture may occur therein so as not to be proper.

(3) Impact Value: 70 $J/cm^2$ or More

In the clutch member, the impact value is an important characteristic for ensuring the product performance. By exhibiting a high impact value, the clutch member can be made thin so that the clutch can be provided in a reduced space, can be made small and lightweight, and can be designed with an increased degree of freedom. In addition, eccentricity of the clutch can be restrained and shift-feeling properties thereof can be improved. For these reasons, the impact value is determined to 70 $J/cm^2$ or more.

(4) Degree of Flatness F: Ratio of Camber d of Flat Portion to Diameter D of Circumscribed Circle of Clutch Member (Heat Treated Material), which is Expressed by the Equation: $F=d/D \times 100$, is 0.15% or Less The clutch members, and particularly, clutch hubs, are rotating bodies so that the degree of flatness thereof is extremely important. By enhancing the degree of flatness, eccentricity of the clutch hub can be restrained, and the shift-feeling properties of the clutch can be improved. For these reasons, the degree of flatness F is determined to 0.15% or less.

(Manufacturing Process of Clutch Member)

Next, the manufacturing process of the clutch member in accordance with the present invention will be explained with reference to FIG. 3.

The manufacturing process of the clutch member in accordance with the present invention includes an annealing step S1 of softening a steel sheet, a punching step S2 of forming the annealed steel sheet into a sheet-shaped raw material with a predetermined configuration, and a heat treatment step S3 of heat treating the formed sheet-shaped raw material to obtain a heat treated material, and the heat treatment step S3 includes a hardening treatment S31 and a tempering treatment S32.

(1) Annealing Step S1

In order to spheroidize the pearlite structure in a hot-rolled steel sheet to cementite, the annealing step is carried out with batch annealing. At this time, the preferable annealing temperature ranges from 650 to 700° C. When the annealing temperature is less than 650° C., the pearlite structure does not change to spheroidized cementite so as to be not preferable. And, at an elevated temperature over 700° C., carbide may become locally coarse so that a uniformly dispersed structure of carbide cannot be obtained. More preferable temperature ranges from 670 to 690° C.

In addition, it is preferable to determine the annealing time to 10 hours or more. However, when the annealing time is too long, carbide may become coarse and energy is wasted so that the upper limit of the annealing time is determined to about 50 hours. By carrying out such an annealing step, the spheroidized level of the hot-rolled steel sheet is made to a uniformly dispersed structure, whereby favorable punchability can be imparted.

(2) Punching Step S2

The punching step is not limited specifically, and the conventionally used well-known press-punching step will do. However, it is desired that a clearance of a die may be decreased as small as possible for reducing distortion occurring in the punching step.

(3) Heat Treatment Step S3

The heat treatment step S3 includes a hardening treatment S31 and a tempering treatment S32.

In the hardening treatment S31, burning at the temperature of $A_{c3}$ or more is required so that ferrite structure does not remain in the hardened structure. Where normally available steel sheets are burnt in this temperature range for a long time, austenite particles may abnormally grow to remarkably obstruct the toughness after hardened. However, the hot-rolled steel sheet in accordance with the present invention contains both a predetermined amount of B and a predetermined amount of Cr so as to restrain coarsening of austenite particles, thereby enabling grain refining. Consequently, the toughness after heat treatment can be improved. In addition, it is preferable that the burning temperature is 900° C. or less for preventing coarsening of crystal particles of the heat treated material, and occurrence of distortion due to hardening thereof, and consequently, it is preferable to carry out burning at the temperature ranging from 840 to 880° C. for 1 to 2 hours.

In order to prevent occurrence of distortions in the hardening step. It is not preferable to cool a coolant at an excessively rapid rate, and it is desired to carry out oil hardening at 60 to 70° C.

The tempering treatment step S32 is carried out to fix free dislocation in martensite which has been obtained due to the hardening treatment, and may be carried out at a low temperature and for a short time, that is at the temperature ranging from 260 to 320° C. for the time ranging from 1 to 2 hours.

With the conventional manufacturing process of the clutch member, the distortion correcting step such as press-tempering must be carried out against the heat treated material for effecting excellent degree of flatness. Namely, by applying a pressing force to the heat treated material, and heating it to the temperature ranging from 400 to 420° C. for about 120 minutes, it has been corrected to have the degree of flatness F of 0.2% or less. In contrast, with the present invention, the clutch member of which the degree of flatness F is 0.15% or less can be obtained without carrying out such a press-tempering treatment, and consequently, the lead time in manufacturing can be reduced, and costs are expected to greatly go down.

B. Test Examples

Hereinafter, the present invention will be explained in more detail based on test examples.

Test Example 1

By annealing hot-rolled steel sheets which respectively have compositions shown in TABLE 1 and a thickness of 5.6 mm, raw materials were prepared, and clutch hubs shown in FIG. 1 were formed from these raw materials by punching. And the mechanical properties of the formed raw materials and the relationship between the internal structure and the formability were examined.

TABLE 1

| No. | Sheet thickness (mm) | Chemical component (mass %) | | | | | | | | | Annealing condition | Note |
|---|---|---|---|---|---|---|---|---|---|---|---|---|
| | | C | Si | Mn | P | S | Cr | Mo | B | Ti | | |
| 1 | 5.6 | 0.34 | 0.05 | 0.43 | 0.010 | 0.004 | 0.28 | — | 0.003 | 0.030 | A | Present invention |
| 2 | 5.6 | 0.36 | 0.03 | 0.42 | 0.010 | 0.005 | 0.21 | — | 0.002 | 0.028 | A | Present invention |
| 3 | 5.6 | 0.36 | 0.03 | 0.42 | 0.010 | 0.008 | 0.21 | — | 0.002 | 0.028 | B | Comparative example |
| 4 | 5.6 | 0.34 | 0.05 | 0.43 | 0.010 | 0.004 | 0.28 | — | 0.003 | 0.030 | — | Comparative example |
| 5 | 5.6 | 0.20 | 0.18 | 0.44 | 0.010 | 0.008 | — | — | — | — | A | Comparative example |

TABLE 1-continued

| | Sheet thickness | Chemical component (mass %) | | | | | | | | | Annealing | |
|---|---|---|---|---|---|---|---|---|---|---|---|---|
| No. | (mm) | C | Si | Mn | P | S | Cr | Mo | B | Ti | condition | Note |
| 6 | 5.6 | 0.24 | 0.19 | 0.41 | 0.008 | 0.003 | 0.28 | — | 0.004 | 0.029 | A | Comparative example |
| 7 | 5.6 | 0.36 | 0.26 | 0.71 | 0.010 | 0.004 | 1.01 | 0.22 | — | — | A | Comparative example |

Note)
Annealing condition A: 680° C. × 50 h
Annealing condition B: 680° C. × 20 h + 730° C. × 20 h + 680° C. × 20 h The annealing conditions against respective steel sheets are as follows: Hot-rolled steel sheets No. 1, 2, 5, 6 and 7 were annealed at 680° C. for 50 hours (annealing condition A). And a hot-rolled steel sheet with an identical composition to that of No. 2 was annealed under the condition of 680° C.×20H→730° C.×20H→680° C.×20H (annealing condition B) to obtain a hot-rolled steel sheet No. 3. The hot-rolled steel sheet No. 4 is composed of an identical kind of steel to that of No. 1, and was subjected only to hot rolling without being annealed. The annealing condition B is one example of the annealing conditions generally applied to the softening annealing (spheroidized annealing) of a high-carbon steel of which the C content is 0.45% or more.

With respect to the formability, the sheet-shaped raw material after being punched was observed visually, and the sheet-shaped raw material including fracture surfaces in end surfaces thereof was judged "rupture", the sheet-shaped raw material including other surfaces than shear surfaces in one part of end surfaces thereof was judged "tear", and the sheet-shaped raw material including shear surfaces over an entire circumference of a punched end surface was judged "good". And the tool life was indicated with the number of pieces of the sheet-shaped raw materials, which have been continuously subjected to punching until fracture surfaces or tears occur in the punched end surface to stop working. The results are shown in TABLE 2.

TABLE 2

| | | Mechanical properties | | | | | | | |
|---|---|---|---|---|---|---|---|---|---|
| No. | Sheet thickness (mm) | Tensile strength (MPa) | Yield strength (MPa) | Elongation (%) | Material hardness (HV) | Spheroidized level | Formability | Tool life (Number of pieces) | Degree of flatness F (%) |
| 1 | 5.6 | 490 | 303 | 36.9 | 142 | Uniform dispersion | good | 6000 | 0.15 |
| 2 | 5.6 | 478 | 292 | 37.2 | 138 | Uniform dispersion | good | 6000 | 0.15 |
| 3 | 5.6 | 420 | 280 | 40.3 | 119 | Coarse dispersion | rupture | 5500 | 0.19 |
| 4 | 5.6 | 810 | 720 | 11.7 | 250 | F + P | rupture | 800 | 0.39 |
| 5 | 5.6 | 434 | 269 | 41.8 | 128 | Uniform dispersion | good | 6500 | 0.12 |
| 6 | 5.6 | 437 | 276 | 41.0 | 132 | Uniform dispersion | good | 6400 | 0.14 |
| 7 | 5.6 | 588 | 417 | 31.0 | 175 | Uniform dispersion | tear | 4000 | 0.46 |

The mechanical properties of the sheet-shaped raw materials were examined using a test piece No. 5 regulated in JIS Z 2201 (Test Pieces for Tensile Test for Metallic Materials) and according to JIS Z 2241 (Method of Tensile Test for Metallic Materials). The hardness of the raw material was obtained by measuring the Vickers hardness (load: 1 kg) HV in arbitrary three positions of the surface of the sheet-shaped raw material, and calculating an average value thereof.

And the structure after annealing (spheroidized level) was judged as follows after getting a sample with a proper size from the sheet-shaped raw material, and observing the cross-section of the sample with a normally available optical microscope. Namely, the structure in which cementite does not greatly vary in configuration, has a particle diameter ranging from 0.1 to 1.2 μm, is spheroidized, and is uniformly dispersed therein was judged "uniform dispersion", whereas the structure in which cementite greatly varies in configuration and particles with a diameter of 1.2 μm or more are dispersed was judged "coarse dispersion". And the structure in which ferrite and pearlite exist in mixture was indicated with "F+P" in TABLE.

As is clarified from TABLE 2, in the steel sheets Nos. 1 and 2 in accordance with the present invention, the spheroidized level in the internal structure thereof is the uniform dispersion, the tensile strength of the raw material is 450 MPa or less, and the hardness thereof was 150 HV or less so that the punchability was good. In addition, the pressing tool life was 6000 pieces which are 1.5 times as large as that of the tool life with the conventional alloy steel No. 7.

No. 3 is obtained by annealing a hot-rolled steel sheet with an identical composition to that of No. 2 under the annealing condition B. Though both the tensile strength and the hardness of the raw material are lower than those of No. 1 and No. 2 of the present invention, the spheroidized level of the internal structure becomes coarse dispersion due to excess annealing, and consequently, an end surface of a sheet-shaped raw material becomes a fracture surface.

As described above, the test specimen No. 4 is a hot-rolled steel sheet with an identical composition to that of the test specimen No. 1, and was not subjected to annealing. Since it has been subjected only to hot rolling, both the tensile strength and the hardness of the raw material are high, and the internal structure is not changed from the mixture structure of ferrite and pearlite, whereby an end surface of the sheet-shaped raw material became a fracture surface. In addition, the tool life was about 800 pieces, which was very short.

With respect to No. 5, C, Si, Cr and B do not satisfy the ranges defined with the present invention. The internal structure thereof is, however, a uniform dispersion in spheroidized level, similarly to that of the material of the present invention, and the punchability was good. In addition, the tensile strength was 450 MPa or less, and the hardness of the raw material was 150 HV or less so that the life of a press tool was 6500 pieces, which was good. However, since the carbon content is low, as later-described, necessary strength after hardened could not be satisfied therewith.

With respect to No. 6, C and Si do not satisfy the ranges defined with the present invention. The spheroidized level is, however, a uniform dispersion, similarly to that of No. 5, and the punchability was good. In addition, the tensile strength was 450 MPa or less, and the hardness of the raw material was 150 HV or less so that the life of a press tool was 6400 pieces, which was good. However, since the carbon content is low, similarly to that of No. 5, necessary strength after hardened could not be satisfied therewith.

No. 7 is composed of an alloy steel SCM435 which has been generally used for conventional clutch members. Si, Mn and Cr of this steel do not satisfy the ranges defined with the present invention, and Mo is contained. Therefore, under the annealing condition A similar to that of the materials of the invention, this steel cannot be changed to the softened state which is suited to the punching work so that the tensile strength was 450 MPa or more, and the hardness of the material was 150 HV or more. And though the spheroidized level of the internal structure is a uniform dispersion, tears occur in an end surface of a sheet-shaped raw material. The tool life was as short as about 4000 pieces, which was not satisfactory.

The mechanical properties after heat treatment were examined using a test piece No. 5 regulated in JIS Z 2201 (Test Pieces for Tensile Test for Metallic Materials) and according to JIS Z 2241 (Method of Tensile Test for Metallic Materials). The impact value after heat treatment was examined using a V notch test piece regulated in JIS Z 2202 (Test Pieces for Impact Test for Metallic Materials) and according to JIS Z 2242 (Method for Impact Test for metallic materials).

Figure 2:
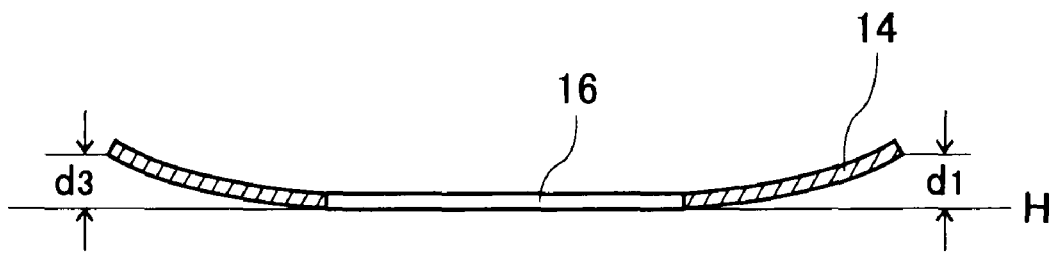
FIG. 2 is a sectional view taken along line x-x of FIG. 1.

The degree of flatness F was calculated by disposing the heat treated materials after heat treatment on a fixed board, and measuring camber d shown in FIG. 2 (difference in level from an inside toward an outside) and the diameter D of a circumscribed circle of the heat treated material shown in FIG. 1, using a micro gauge (manufactured by Mitutoyo Corporation, 513-424).

Hereinafter, a clutch hub shown in FIG. 1 and FIG. 2 will be explained. FIG. 1 is a plan view, and FIG. 2 is a sectional view taken along line x-x of FIG. 1. A clutch hub 1 is formed by punching a steel sheet, and a base part 12 for engagement with a shaft (not shown) of a transmission as a driven member, and a tongue-shaped flat portion 14 which extends from the base part 12 in the outer peripheral direction thereof are formed integrally. And, a center hole 16 is provided in a center of the base part 12, and a spline 18 for engagement with the shaft is formed along an outer periphery of the center hole 16. In the clutch hub 1 of FIG. 1, four flat portions 14 are provided. In FIG. 1, a one-dot chain line C is a circumscribed circle of the clutch hub (that is the heat treated material) with a diameter D. And the flat portion 14 of the clutch hub 1 has a distortion (camber) against a horizontal plane H such as a fixed board. For example, the amount of distortion is d1 in the flat portion 14a, and d3 in the flat portion 14c. Similarly, d2 in the flat portion 14b and d4 in the flat portion 14d. And the distortion d of this clutch hub 1 (heat treated material) is determined to d=(d1+d2+d3+d4)/4.

TABLE 3

| No. | Note) Sheet thickness (mm) | Mechanical properties | | | Hardness after heat treatment (HV) | Impact value (J/cm2) |
| --- | --- | --- | --- | --- | --- | --- |
| | | Tensile strength (MPa) | Yield strength (MPa) | Elongation (%) | | |
| 1 | 2.0 | 1438 | 1330 | 9.0 | 449 | 71 |
| 2 | 2.0 | 1433 | 1327 | 9.0 | 446 | 72 |
| 3 | 2.0 | 1430 | 1324 | 9.0 | 443 | 70 |
| 4 | 2.0 | 1438 | 1330 | 9.0 | 449 | 71 |
| 5 | 2.0 | 1160 | 1090 | 12.0 | 350 | 75 |
| 6 | 2.0 | 1230 | 1160 | 10.0 | 370 | 86 |
| 7 | 2.0 | 1440 | 1320 | 9.0 | 448 | 58 |

Note)
A thickness of 2 mm is obtained by subjecting a hot-rolled steel sheet with a thickness of 5.6 mm to cold rolling.

Test Example 2

Each of the sheet-shaped raw materials obtained in the test example 1 was subjected to heat treatment, and after heat treatment, the mechanical properties, hardness, and impact value were obtained, and camber in flat portions was to obtain the degree of flatness F.

The heat treatment was carried out by hardening test specimens in an oil of 70° C. after heating at 860° C.×1 hour, and then tempering the test specimens No. 1 through No. 6 for 260° C.×for 1 hour. The test specimen No. 7 was subjected to the tempering treatment at 430° C.×for 1 hour. The results of the heat treatment are shown in TABLE 3 (The results of the degree of flatness F were shown in TABLE 2 together).

The mechanical properties and the hardness after heat treatment of No. 1, 2, 3, 4 and 7 satisfied the ranges defined in the present invention. However, No. 5 and 6 which were good with respect to all the evaluation items in TABLE 1, similarly to the materials of the invention exhibited a reduced tensile strength and a reduced hardness after heat treatment, because they contain composition such as the C content, which is out of the composition range defined in the present invention, and consequently, both the mechanical properties and hardness defined in the present invention could not be satisfied therewith. And, No. 7 was subjected to the tempering treatment at a temperature as high as 430° C. in order to make the tensile strength thereof equal to those of other test specimens, but the resulted impact value was 58 J/cm² which could not satisfy the impact value defined in the present invention.

With respect to the degree of flatness F, No. 1, 2, 5 and 6 could satisfy the range defined in the present invention.

The above-described results of Test example 1 and Test example 2 show that the clutch members of the test specimens No. 1 and No. 2 in accordance with the present invention can satisfy the range defined in the present invention in every items.

The present invention is not limited to the above-described test examples, but modifications may will do as far as they do not depart from the spirit and the scope of the present invention. For example, in the test examples, hot-rolled steel sheets were used as raw materials, but alternatively, cold-rolled materials may be used.

INDUSTRIAL APPLICABILITY

The clutch member and the process for manufacturing the same in accordance with the present invention can be preferably applied to a clutch hub in a dry type single plate clutch. And the process for manufacturing the clutch member in accordance with the present invention may be also applied to the production of spur gears, etc.

The invention claimed is:

1. A process for manufacturing a clutch hub of a dry type single plate clutch, in which a degree of flatness F is defined to be 0.15% or less which is obtained by a formula "F=d/D*100", wherein d is a camber of a flat portion (a distance from a horizontal plane to an edge portion of the flat portion) and D is a diameter of a circumscribed circle of the clutch hub, the process comprising:
    annealing a steel sheet composed of 0.32 to 0.38% of C (carbon), 0.15% or less of Si (silicon), 0.3 to 0.5% of Mn (manganese), 0.16 to 0.60% of Cr (chromium) and 0.0010 to 0.0050% of B (boron) by mass ratio, the balance being Fe (iron) and inevitable impurities;
    punching the annealed steel sheet to form a sheet-shaped material with a predetermined configuration; and
    applying a heat treatment to the formed sheet-shaped material to obtain a heat treated material, wherein
    the applying the heat treatment includes hardening the formed sheet-shaped material by putting in oil of 60 to 70° C. after heating for 1 to 2 hours at 840 to 880° C., and tempering for 1 to 2 hours at 260 to 320° C. after the hardening.

2. The process for manufacturing the clutch hub of the dry type single plate clutch according to claim 1, wherein the annealing is performed under the temperature of 650 to 700° C. for 10 to 50 hours.

3. The process for manufacturing the clutch hub of the dry type single plate clutch according to claim 1, wherein the annealing includes forming the annealed steel sheet to include an initial uniformity dispersed structure of carbide with an average particle diameter of 0.1 to 1.2 μm with a tensile strength of 450 MPa or less and a hardness of 150 Hv or less.

4. The process for manufacturing the clutch hub of the dry type single plate clutch according to claim 1, wherein the applying the heat treatment includes forming the clutch hub to include a tensile strength of 1307 to 1633 MPa, a hardness of 400 to 500 HV, and an impact value of 70 J/cm$^2$ or more.

* * * * *